US010652622B2

(12) United States Patent
Wu et al.

(10) Patent No.: US 10,652,622 B2
(45) Date of Patent: May 12, 2020

(54) METHOD AND APPARATUS FOR PROVIDING CONTENT BASED UPON A SELECTED LANGUAGE

(71) Applicant: AT&T INTELLECTUAL PROPERTY I, L.P., Atlanta, GA (US)

(72) Inventors: Xidong Wu, San Ramon, CA (US); Zhengye Liu, Pleasanton, CA (US); Mario Kosseifi, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 6 days.

(21) Appl. No.: 15/634,505

(22) Filed: Jun. 27, 2017

(65) Prior Publication Data
US 2018/0376218 A1 Dec. 27, 2018

(51) Int. Cl.
*H04N 5/445* (2011.01)
*H04N 21/485* (2011.01)
(Continued)

(52) U.S. Cl.
CPC ......... *H04N 21/4856* (2013.01); *G06F 40/58* (2020.01); *H04N 21/2353* (2013.01);
(Continued)

(58) Field of Classification Search
CPC . H04N 21/4856; H04N 21/8106; H04N 5/607
(Continued)

(56) References Cited

U.S. PATENT DOCUMENTS

| 7,353,166 B2 | 4/2008 | Rittner et al. |
| 7,571,455 B2 | 8/2009 | Lee |

(Continued)

FOREIGN PATENT DOCUMENTS

| CA | 2351533 A1 | 6/2000 |
| CA | 2459334 A1 | 3/2003 |

(Continued)

OTHER PUBLICATIONS

"eyetv hybrid Digital TV on your Mac & PC.", Geniatech, geniatech. eu, Apr. 12, 2017., pp. 1-11.
(Continued)

*Primary Examiner* — Pankaj Kumar
*Assistant Examiner* — Sahar Aqil Riaz
(74) *Attorney, Agent, or Firm* — Guntin & Gust, PLC; Ralph Trementozzi

(57) ABSTRACT

Aspects of the subject disclosure may include, for example, providing media content to a presentation device, wherein the media content comprises first audio content in a first language; receiving, from an end user device, a language request, wherein the language request identifies a second language; obtaining, responsive to the second language, second audio content, wherein the second audio content is a translation of the first audio content into the second language; providing, to the end user device, the second audio content; obtaining, responsive to the second language identified in the language request, supplemental audio content, wherein the supplemental audio content is in the second language, wherein the supplemental audio content is not a translation of the first audio content into the second language, and wherein the supplemental audio content relates to the second language; and providing, to the end user device, the supplemental audio content. Other embodiments are disclosed.

20 Claims, 13 Drawing Sheets

(51) Int. Cl.
*H04N 21/235* (2011.01)
*H04N 21/414* (2011.01)
*H04N 21/41* (2011.01)
*H04N 21/2668* (2011.01)
*H04N 21/418* (2011.01)
*H04N 21/43* (2011.01)
*H04N 21/258* (2011.01)
*G06F 40/58* (2020.01)
*H04N 21/81* (2011.01)

(52) U.S. Cl.
CPC ... *H04N 21/25866* (2013.01); *H04N 21/2668* (2013.01); *H04N 21/4126* (2013.01); *H04N 21/4183* (2013.01); *H04N 21/41407* (2013.01); *H04N 21/4307* (2013.01); *H04N 21/812* (2013.01)

(58) Field of Classification Search
USPC .......................................................... 725/42
See application file for complete search history.

(56) References Cited

U.S. PATENT DOCUMENTS

| | | | | |
|---|---|---|---|---|
| 7,852,416 | B2* | 12/2010 | Bennett | H04N 5/607 348/14.04 |
| 8,356,316 | B2* | 1/2013 | Velazquez | H04H 20/59 725/33 |
| 8,407,736 | B2 | 3/2013 | McClenny et al. | |
| 8,509,727 | B2 | 8/2013 | Medford et al. | |
| 8,566,864 | B2* | 10/2013 | McClenny | G08B 27/005 340/286.02 |
| 8,799,955 | B2 | 8/2014 | Jones et al. | |
| 8,848,109 | B2 | 9/2014 | Pornprasitsakul et al. | |
| 9,374,612 | B2* | 6/2016 | Bangalore | G06F 17/289 |
| 9,854,326 | B1* | 12/2017 | Liassides | H04N 21/812 |
| 9,864,809 | B2* | 1/2018 | Travieso | G06F 17/3087 |
| 2002/0058234 | A1 | 5/2002 | West et al. | |
| 2013/0117793 | A1 | 5/2013 | Yang et al. | |
| 2014/0016513 | A1* | 1/2014 | Garcia Martin | H04L 51/38 370/259 |
| 2014/0040039 | A1* | 2/2014 | Gates, III | G06Q 30/0269 705/14.66 |
| 2016/0103690 | A1* | 4/2016 | Kim | G06F 9/454 704/8 |
| 2016/0105707 | A1* | 4/2016 | Chen | H04N 21/233 725/25 |
| 2017/0300976 | A1* | 10/2017 | Dogruoz | G06Q 30/0269 |
| 2017/0366839 | A1* | 12/2017 | Hawkins | H04N 21/4126 |

FOREIGN PATENT DOCUMENTS

| | | |
|---|---|---|
| CN | 201319640 Y | 9/2009 |
| CN | 104219459 A | 12/2014 |
| GB | 2376580 B | 6/2005 |
| JP | H1198434 | 4/1999 |
| WO | 2011028174 A1 | 3/2011 |
| WO | 2011146059 A1 | 11/2011 |
| WO | 2016037440 A1 | 3/2016 |

OTHER PUBLICATIONS

Cohen, Peter, "Miglia introduces TVMini—USB stick TV receiver", Macworld, macworld.com. Sep. 19, 2005, 1 page.

Zengin, Bugra et al., "English Language Learners' Attitudes to Back-Seat TV Systems and Subtitled Movies", Turkish Studies, International Periodical For the Languages, Literature and History of Turkish or Turkic, vol. 8/8 Summer 2013, pp. 1561-1573.

* cited by examiner

120

160

180

240

```
┌─────────────────────────────────────────────────────────────────┐
│ Engaging in a communication session with a content providing    │
│ device, wherein the communication session comprises receiving   │
│ from the content providing device a list of a plurality of      │
│ available languages corresponding to audio content that the     │
│ content providing device is providing to a television in        │
│ association with a media program and wherein the communication  │
│ session comprises sending to the content providing device a     │
│ selected language chosen from the list                          │
│                                                          372    │
└─────────────────────────────────────────────────────────────────┘
                               │
                               ▼
┌─────────────────────────────────────────────────────────────────┐
│ Receiving, from the content providing device, the audio content │
│ in the selected language, wherein the audio content is received │
│ by a mobile device substantially simultaneously with the        │
│ providing of a first portion of the media program to the        │
│ television                                                      │
│                                                          374    │
└─────────────────────────────────────────────────────────────────┘
                               │
                               ▼
┌─────────────────────────────────────────────────────────────────┐
│ Receiving, from the content providing device, an advertising    │
│ image, wherein the advertising image is received by the mobile  │
│ device substantially simultaneously with the providing of a     │
│ second portion of the media program to the television, wherein  │
│ the second portion is different from the first portion and      │
│ wherein the advertising image is not part of the media program  │
│                                                          376    │
└─────────────────────────────────────────────────────────────────┘
                               │
                               ▼
┌─────────────────────────────────────────────────────────────────┐
│ Presenting, on the display (of the mobile device), the          │
│ advertising image                                               │
│                                                          378    │
└─────────────────────────────────────────────────────────────────┘
```

METHOD AND APPARATUS FOR PROVIDING CONTENT BASED UPON A SELECTED LANGUAGE

FIELD OF THE DISCLOSURE

The subject disclosure relates to a method and apparatus for providing content based upon a selected language.

BACKGROUND

Typically, a media program contains video along with embedded multiple audio tracks of different languages (e.g., English and Spanish in the United States). When the media program is presented via a TV, the TV usually outputs via speaker the default language track (or any particular single language track selected by the TV or an associated set-top box).

BRIEF DESCRIPTION OF THE DRAWINGS

Reference will now be made to the accompanying drawings, which are not necessarily drawn to scale, and wherein:

FIG. 3C depicts an illustrative embodiment of a method used in portions of the systems described in FIGS. 1A-1E;

DETAILED DESCRIPTION

The subject disclosure describes, among other things, illustrative embodiments for providing content based upon a selected language. Other embodiments are described in the subject disclosure.

One or more aspects of the subject disclosure include distributing one or more audio tracks in one or more languages to one or more viewers of a media program (e.g., a television show, a movie, a sporting event).

One or more aspects of the subject disclosure include utilizing an external dongle that can communicate with legacy (that is, existing) set-top boxes. As used herein, the term dongle includes a hardware device. In one example, the external dongle can comprise firmware and/or software. In another example, the external dongle can comprise an application specific integrated circuit (ASIC). In another example, the external dongle can comprise a field-programmable gate array (FPGA).

One or more aspects of the subject disclosure can incorporate the functionality of the dongle into a set-top box or a TV (rather than utilizing an external dongle). In one example, the integrated dongle can comprise firmware and/or software. In another example, the integrated dongle can comprise an application specific integrated circuit (ASIC). In another example, the integrated dongle can comprise a field-programmable gate array (FPGA).

Figure 1A:
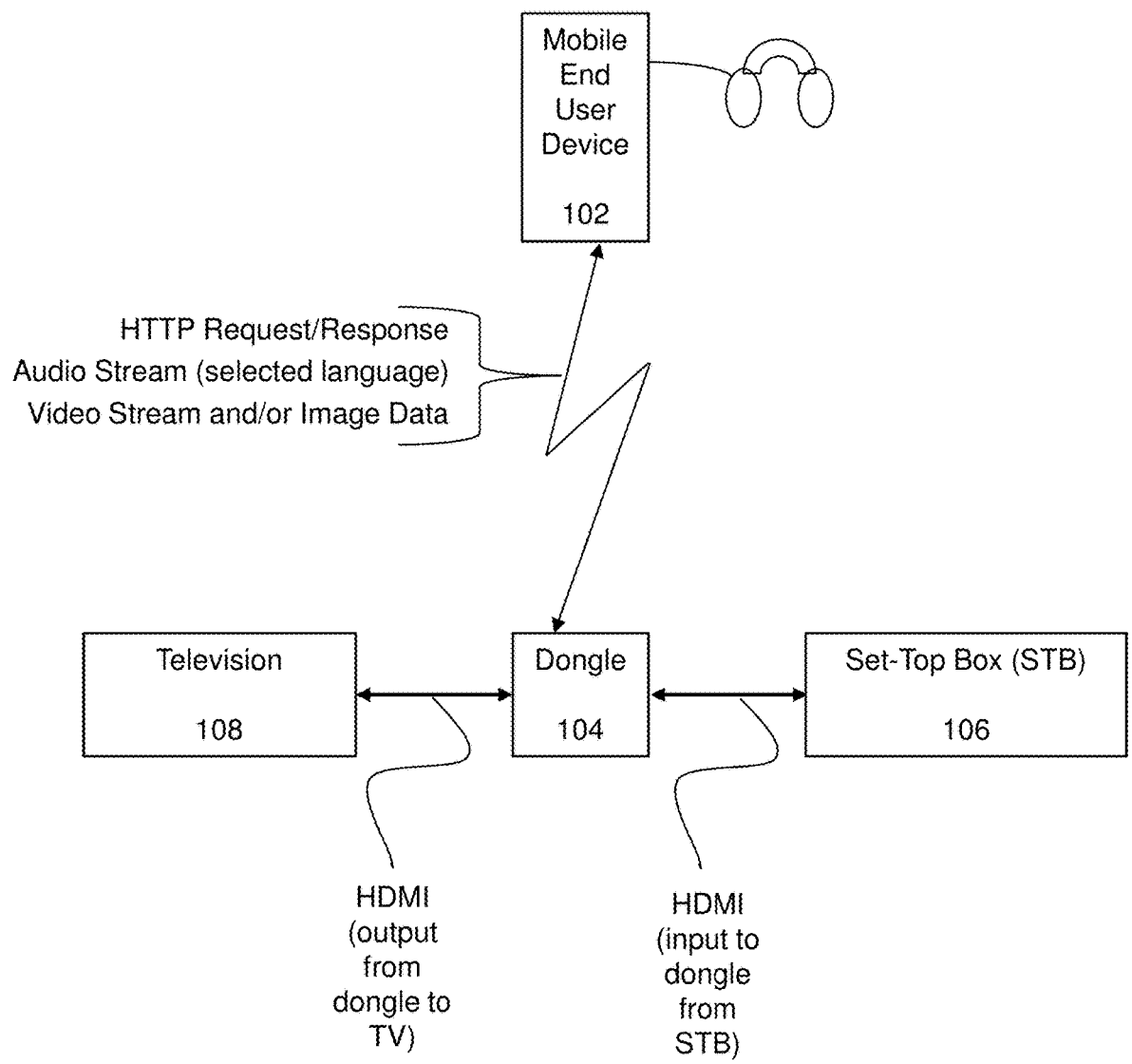
FIG. 1A depicts an illustrative embodiment of a system for providing content to a mobile end user device.

Referring now to FIG. 1A, this depicts an illustrative embodiment of a system 100 for providing content to a mobile end user device 102. In various examples, the content provided to the mobile end user device 102 can comprise audio content, video content and/or image(s). Mobile end user device 102 can comprise, for example, a smartphone, a tablet, a laptop computer, a notebook computer or any combination thereof. Mobile end user device 102 can include a display (not shown) and/or a speaker (not shown). Mobile end user device 102 can be configured to provide output to headphones (shown but not separately numbered). The headphones can enable the end user to privately listen to audio content. Mobile end user device 102 can be configured to communicate (e.g., bi-directionally) with dongle 104. The communication between mobile end user device 102 and dongle 104 can be wireless communication. The wireless communication between mobile end user device 102 and dongle 104 can be via WiFi, BLUETOOTH and/or any other appropriate mechanism. The communication between mobile end user device 102 and dongle 104 can include, as discussed in more detail below: (a) HTTP requests (e.g., via a web page hosted by dongle 104) and/or HTTP responses (e.g., via a web page hosted by dongle 104); (b) an audio stream (e.g., in a selected language) that is provided to mobile end user device 102 from dongle 104; (c) a video stream that is provided to mobile end user device 102 from dongle 104; (d) one or more images provided to mobile end user device 102 from dongle 104; and (e) any combination thereof.

Still referring to FIG. 1A, dongle 104 can be configured to communicate (e.g., bi-directionally) with set-top box 106. The communication between dongle 104 and set-top box 106 can be wireless and/or by wire (e.g., Universal Serial Bus (USB) and/or HDMI). The communication can include HDMI content that is input to dongle 104 from set-top box 106. Dongle 104 can be configured to communicate (e.g., bi-directionally) with television 108. The communication between dongle 104 and television 108 can be wireless and/or by wire (e.g., USB and/or HDMI). The communication can include HDMI content that is output from dongle 104 to television 108.

Still referring to FIG. 1A, dongle 104 can provide components and/or functionality to perform: (a) connecting to BLUETOOTH and/or Wi-Fi; (b) connecting to set-top box 106 (e.g., via HDMI (High-Definition Multimedia Interface) cable for audio/video input); (c) connecting to TV 108 (e.g., via HDMI cable for audio/video output); (d) utilizing Ethernet and/or USB and/or Wi-Fi and/or BLUETOOTH for initial configuration purposes (e.g., initial configuration of the dongle 104 and/or the mobile end user device 102) and/or updates (e.g., updated configuration of the dongle 104 and/or the mobile end user device 102); (e) read all audio tracks (e.g., different languages) from audio/video input; (f) display language options for the audio/video content on an HTTP page (the dongle 104 can host an HTTP server); (g) receive a request from mobile end user device 102 (e.g., a smartphone) for a specific language; (h) stream audio of selected language to mobile end user device 102 upon receiving request; and (i) any combination thereof.

Still referring to FIG. 1A, mobile end user device 102 can provide components and/or functionality to perform: (a) configuration (e.g., initial configuration) of the dongle 104 and/or the mobile end user device 102; (b) updates (e.g., updated configuration) of the dongle 104 and/or the mobile end user device 102); (c) scanning (e.g., via WiFi) for all dongle(s) in a network; (d) communicating with a selected dongle for available languages (e.g., for the video content being presented on a television); (e) sending a request to the dongle (e.g., responsive to a user clicking on a selected language); (f) receiving an audio stream (e.g., in the selected language); and (g) any combination thereof. In one specific example, one or more functions may be provided by an app installed on the end user device (e.g., a mobile end user device such as a smartphone).

Figure 1B:
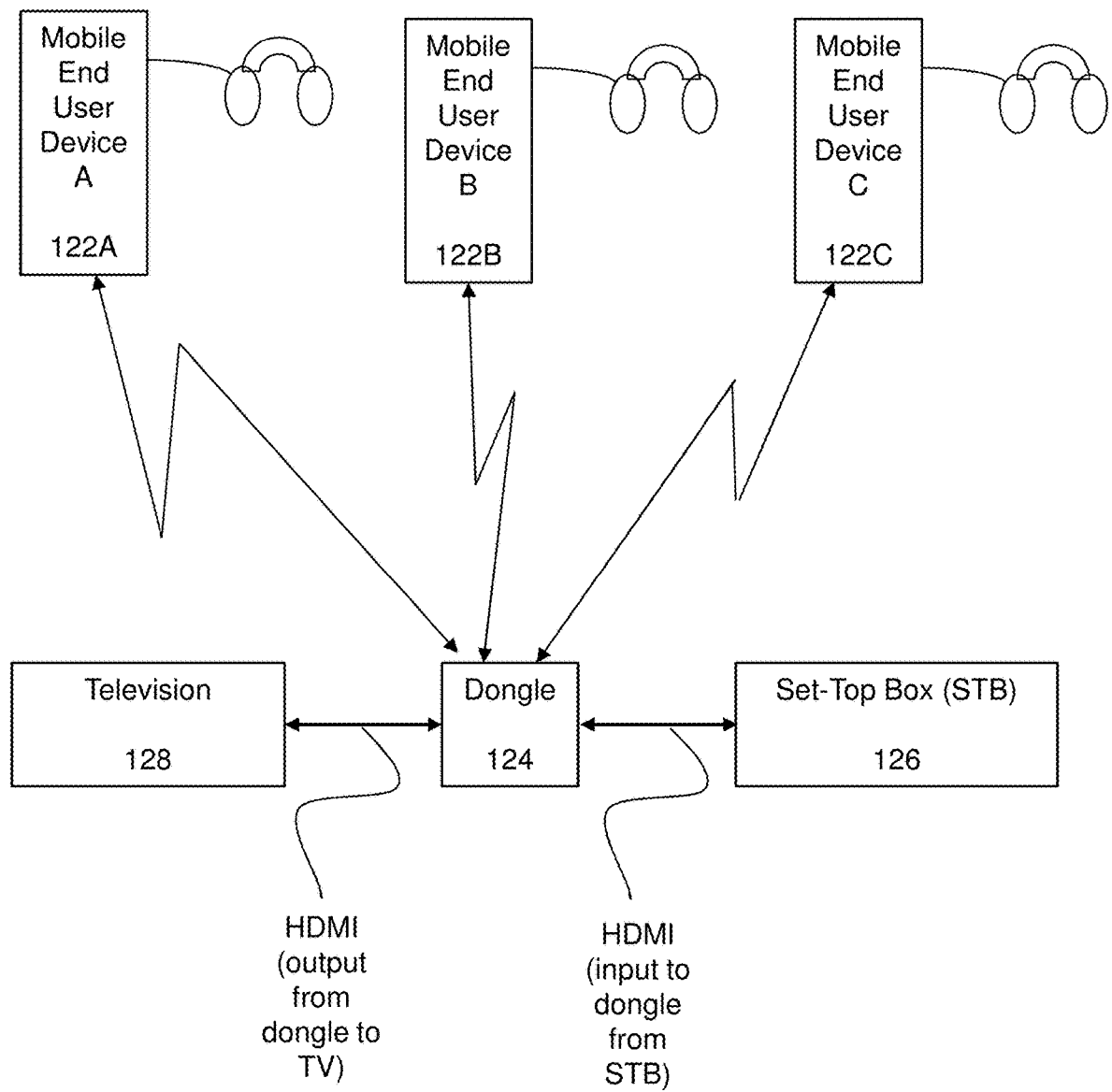
FIG. 1B depicts an illustrative embodiment of a system for providing content to a plurality of mobile end user devices.

Referring now to FIG. 1B, this depicts an illustrative embodiment of a system 120 for providing content to a plurality of mobile end user devices 122A, 122B, 122C (although three mobile end user devices are shown in this example, any desired number of mobile end user devices may be used). System 120 further includes dongle 124, set-top box 126 and television 128. Each of mobile end user devices 122A, 122B, 122C can operate in a manner similar to that described above with reference to FIG. 1A. Each of mobile end user devices 122A, 122B, 122C can communicate with dongle 124 in a manner similar to that described above with reference to FIG. 1A. Dongle 124 can operate in a manner similar to that described above with reference to FIG. 1A. Dongle 124 can communicate with set-top box 126 and television 128 in a manner similar to that described above with reference to FIG. 1A. Each of mobile end user devices 122A, 122B, 122C can have associated therewith its own specific language. In one specific example, each language can be associated with each end user device via a respective user profile. In another specific example, each language can be selected (such as at each time of use) by each end user device (that is, by each respective user).

Figure 1C:
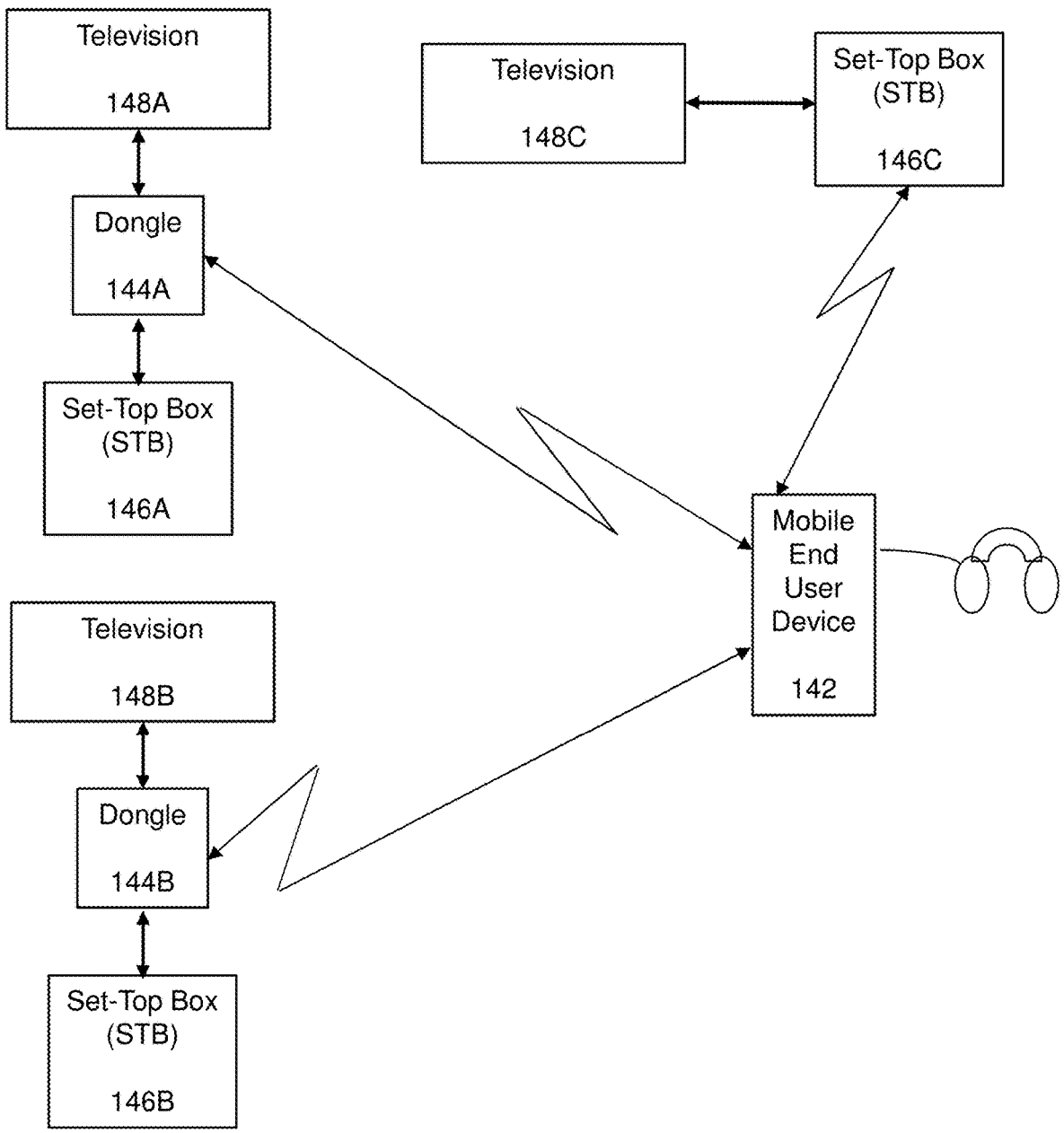
FIG. 1C depicts an illustrative embodiment of a system for providing content to a mobile end user device.

Referring now to FIG. 1C, this depicts an illustrative embodiment of a system 140 for providing content to a mobile end user device 142. System 140 includes dongle 144A, set-top box 146A, television 148A, dongle 144B, set-top box 146B, television 148B, set-top box 146C and television 148C. Dongle 144A can operate in a manner similar to that described above with reference to FIG. 1A. Dongle 144A can communicate with set-top box 146A and television 148A in a manner similar to that described above with reference to FIG. 1A. Dongle 144B can operate in a manner similar to that described above with reference to FIG. 1A. Dongle 144B can communicate with set-top box 146B and television 148B in a manner similar to that described above with reference to FIG. 1A. Set-top box 146C has incorporated therein functionality for operating as a dongle. Set-top box 146C can operate as a set-top box and can also operate as a dongle in a manner similar to that described above for dongle 104 of FIG. 1A.

Still referring to FIG. 1C, mobile end user device 142 can operate in a manner similar to that described above with reference to FIG. 1A. In addition, mobile end user device 142 can operate to determine which language(s) are available from dongle 144A. Further, mobile end user device 142 can operate to determine which language(s) are available from dongle 144B. Further still, mobile end user device 142 can operate to determine which language(s) are available from set-top box 146C. In one example, mobile end user device 142 can determine which language(s) are available from dongle 144A by wirelessly polling dongle 144A, mobile end user device 142 can determine which language(s) are available from dongle 144B by wirelessly polling dongle 144B and mobile end user device 142 can determine which language(s) are available from set-top box 146C by wirelessly polling set-top box 146C. The polling may be, for example, request/response. In another example, mobile end user device 142 can determine which language(s) are available from dongle 144A by receiving a broadcast (e.g., an asynchronous wirelessly broadcast) from dongle 144A, mobile end user device 142 can determine which language(s) are available from dongle 144B by receiving a broadcast (e.g., an asynchronous wirelessly broadcast) from dongle 144B and mobile end user device 142 can determine which language(s) are available from set-top box 146C by receiving a broadcast (e.g., an asynchronous wirelessly broadcast) from set-top box 146C.

Figure 1D:
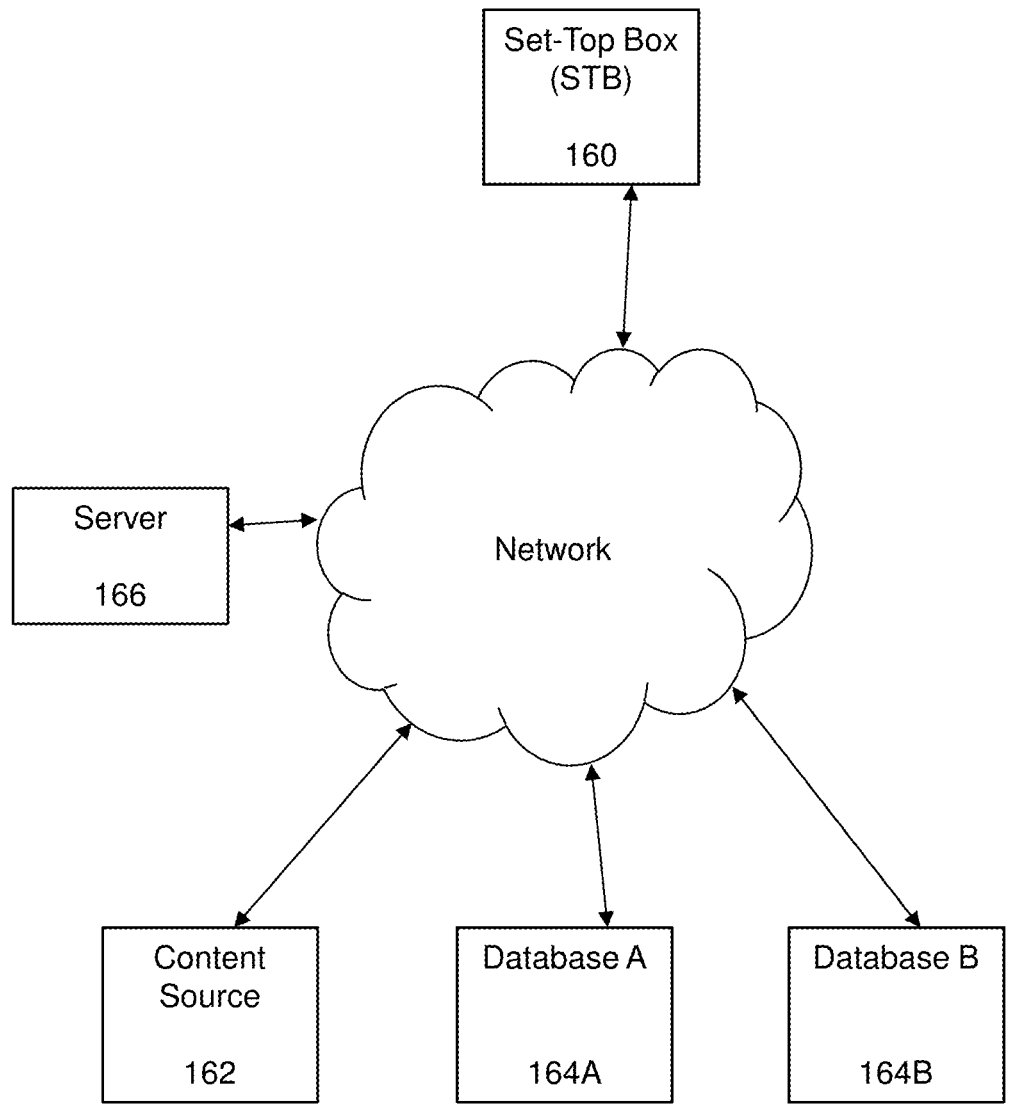
FIG. 1D depicts an illustrative embodiment of a system for obtaining content to be provided to a mobile end user device.

Referring now to FIG. 1D, this depicts an illustrative embodiment of a system 160 for obtaining content to be provided to a mobile end user device. Set-top box 160 can communicate via a network (e.g., the Internet) with content source 162, database A 164A and database B 164B. In one example, content source 162 is a source of media content (e.g., broadcast media content). In another example, database A 164A is a source of audio content, such as audio content in a specific language. In one specific example, the audio content in database A 164A can comprise audio content that corresponds to audio content of media from content source 162 but that has been translated into one or more other languages. For instance, content source 162 can contain a movie that is in the English language and database 164A can contain corresponding audio in the Spanish, French, German and Greek languages. Server 166 can communicate with set-top box 160 to, for example, instruct set-top box 160 which content source(s) to use and/or which database(s) to use.

Still referring to FIG. 1D, database B 164B can contain images, each of which corresponds to a specific language. In one specific example, the images of database B 164B can comprise advertising related to a specific language. In another example, database B 164B can contain video clips, each of which corresponds to a specific language. In one specific example, the video clips of database B 164B can comprise advertising related to a specific language. In another example, database b 164B can contain audio clips, each of which corresponds to a specific language. In one specific example, the audio clips of database B 164B can comprise advertising related to a specific language. The related advertising described herein can comprise, for example, travel advertising, food advertising, product advertising and/or service advertising.

Figure 1E:
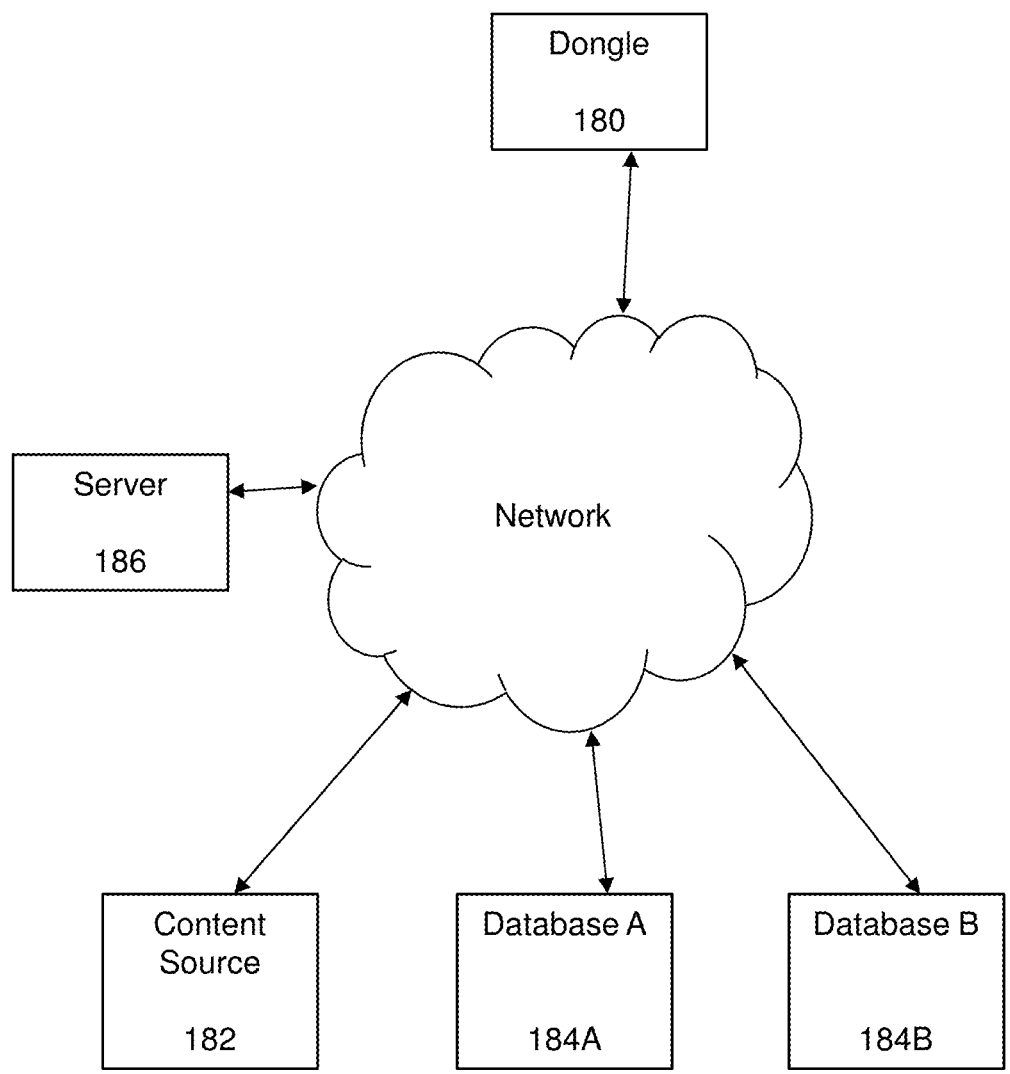
FIG. 1E depicts an illustrative embodiment of a system for obtaining content to be provided to a mobile end user device.

Referring now to FIG. 1E, this depicts an illustrative embodiment of a system 180 for obtaining content to be provided to a mobile end user device. Dongle 180 can communicate via a network (e.g., the Internet) with content source 182, database A 184A and database B 184B. Each of content source 182, database A 184A and database B 184B can provide content, images, video clips and/or audio clips similar to those described above with reference to FIG. 1D. Server 186 can communicate with dongle 180 to, for example, instruct dongle 180 which content source(s) to use and/or which database(s) to use.

Figure 2A:
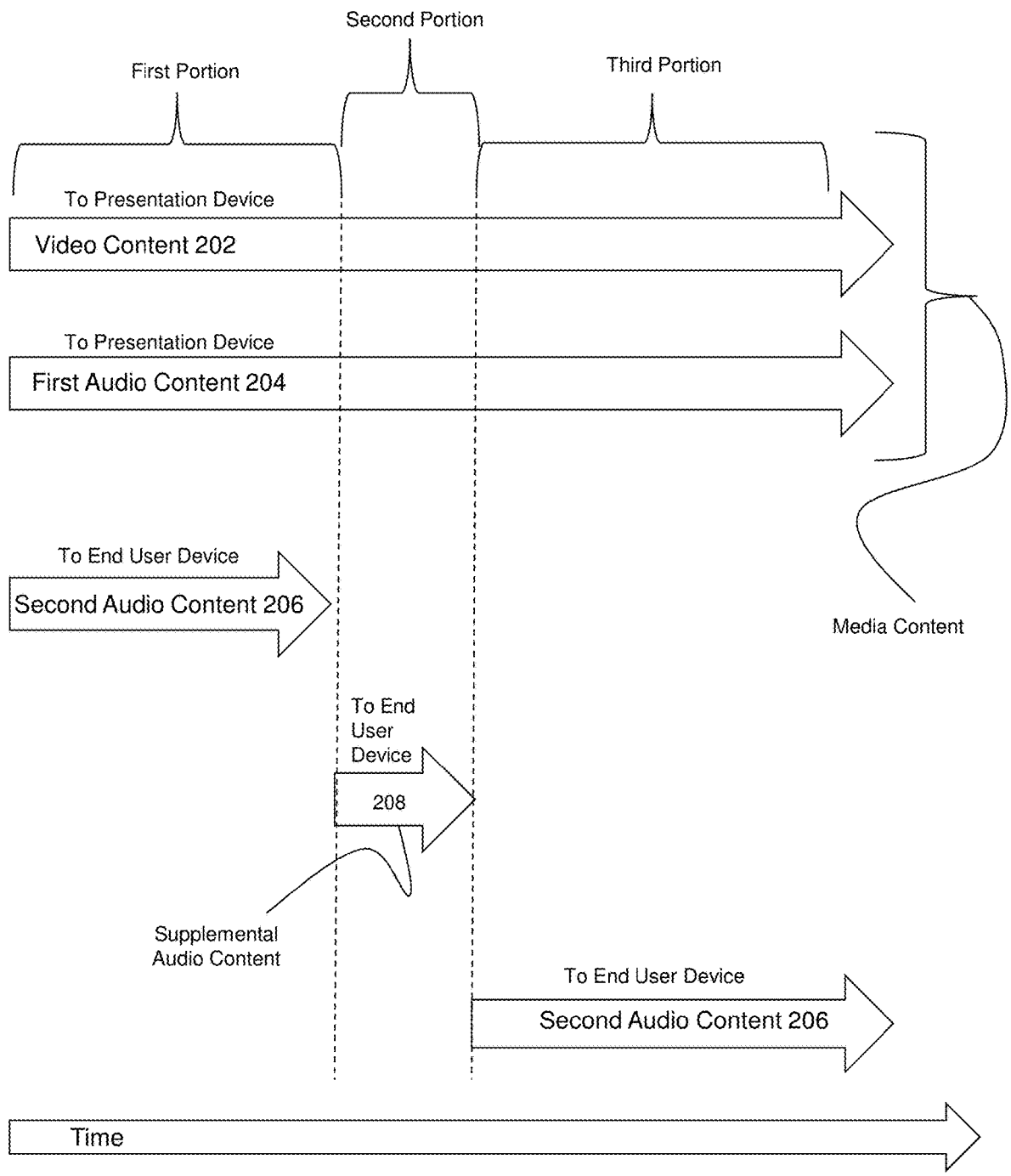
FIG. 2A depicts a diagram showing various content portions according to an illustrative embodiment.

Referring now to FIG. 2A, this depicts a diagram showing various content portions according to an illustrative embodiment. Media content that is provided to a presentation (such as a TV) device comprises video content 202 and first audio content 204 (in various examples, the media content can comprise a movie, a television show, a sporting event). The first audio content 204 is in a first language (e.g., the English language). During a first portion of the media content (e.g., a non-advertisement portion of a movie, a television show or a sporting event), second audio content 206 is provided to an end user device (e.g., a mobile end user device such as a smartphone). The second audio content 206 corresponds to the first audio content 204 and the second audio content 206 is in a second language that is different from the first language (for example, the second audio content 206 can be a translation of the first audio content 204 into the Spanish language).

Still referring to FIG. 2A, during a second portion of the media content (e.g., an advertisement portion of a movie, a television show or a sporting event), supplemental audio content 208 is provided to the end user device. The supplemental audio content 208 is in the second language. The supplemental audio content 208 does not correspond, in this example, to the advertisement being presented during the second portion. Rather, the supplemental audio content 208 corresponds to the second language itself. For example, if the second language is Greek, the supplemental audio content 208 can comprise a travel advertisement to Greece or an advertisement for Greek style food or a Greek restaurant. In these examples, the supplemental audio content 208 is unrelated to the advertising of the second portion of the media content. During a third portion of the media content (e.g., once again, a non-advertisement portion of a movie, a television show or a sporting event), second audio content 206 is again provided to the end user device 204. The second audio content 206 at this point again corresponds to the first audio content 204 and the second audio content 206 is again in the second language that is different from the first language.

Figure 2B:
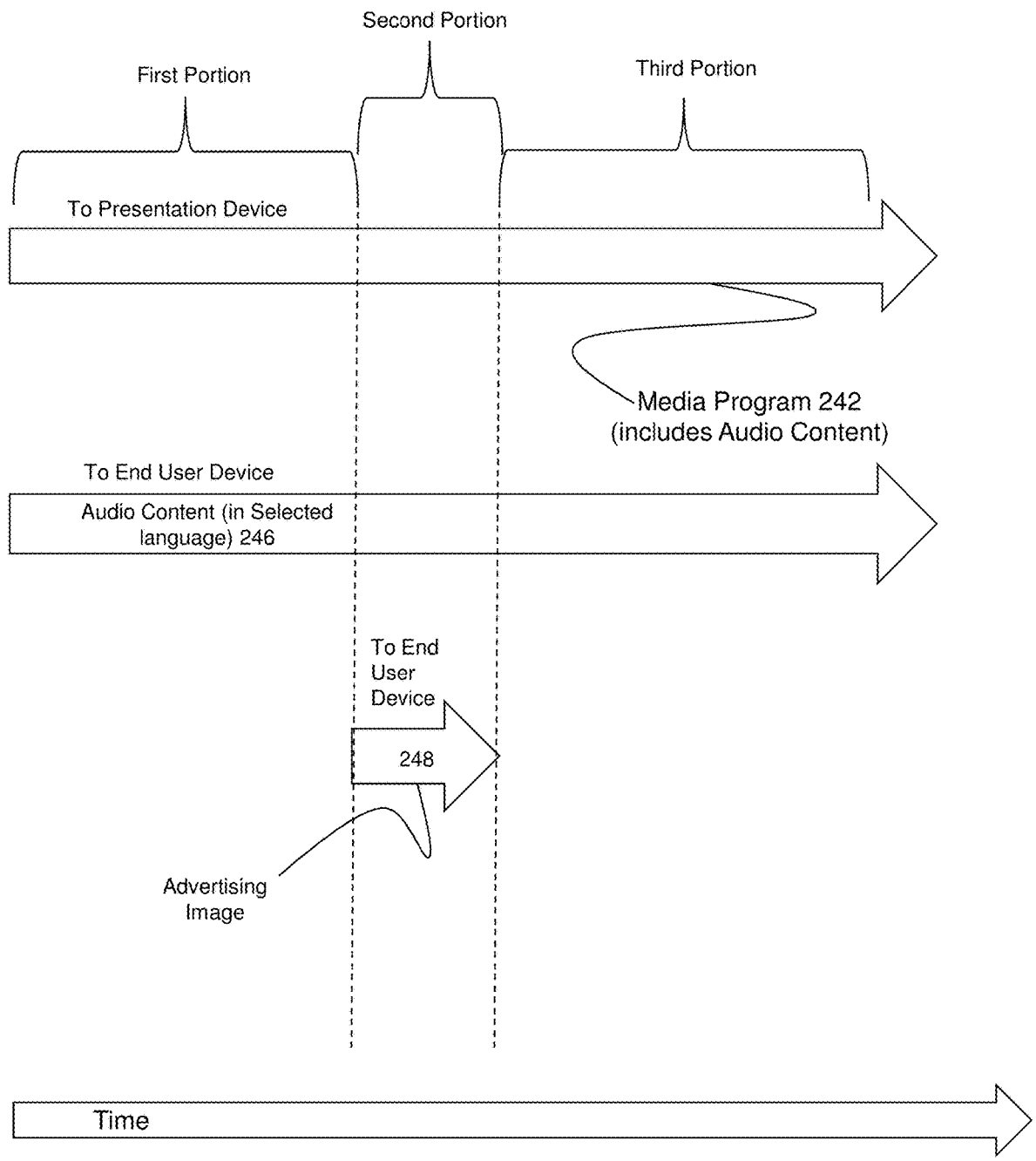
FIG. 2B depicts a diagram showing various content portions according to an illustrative embodiment.

Referring now to FIG. 2B, this depicts a diagram showing various content portions according to an illustrative embodiment. Media content 242 is provided to a presentation device (e.g. a TV). The media content 242 comprises audio content. In various examples, the media content 242 can comprise a movie, a television show, a sporting event. The audio content of the media program 242 is in a first language (e.g., the English language). During a first portion of the media content 242 (e.g., a non-advertisement portion of a movie, a television show or a sporting event), audio content 246 (in a selected language) is provided to an end user device (e.g., a mobile end user device such as a smartphone). The audio content 246 corresponds to the audio content of the media program 242 and the audio content 246 is in a second language that is different from the first language (for example, the audio content 246 can be a translation of the audio content of the media program 242 into the Spanish language).

Still referring to FIG. 2B, during a second portion of the media content 242 (e.g., an advertisement portion of a movie, a television show or a sporting event), supplemental advertising image 248 is provided to the end user device (for display thereon). The advertising image 248 can comprise, for example, a single image, a plurality of images, a video clip, audio/visual clip, and/or any combination thereof. The supplemental advertising image 248 does not correspond to the advertisement being presented during the second portion. Rather, the advertising image 248 corresponds to the second language itself. For example, if the second language is French, the supplemental advertising image 248 can comprise a travel advertisement to France or an advertisement for French style food or a French restaurant. In these examples, the advertising image 248 is unrelated to the advertising of the second portion of the media program 242. During a third portion of the media program 242 (e.g., once again, a non-advertisement portion of a movie, a television show or a sporting event) the advertising image 248 can be no longer provided to and/or displayed by the end user device.

Figure 3A:
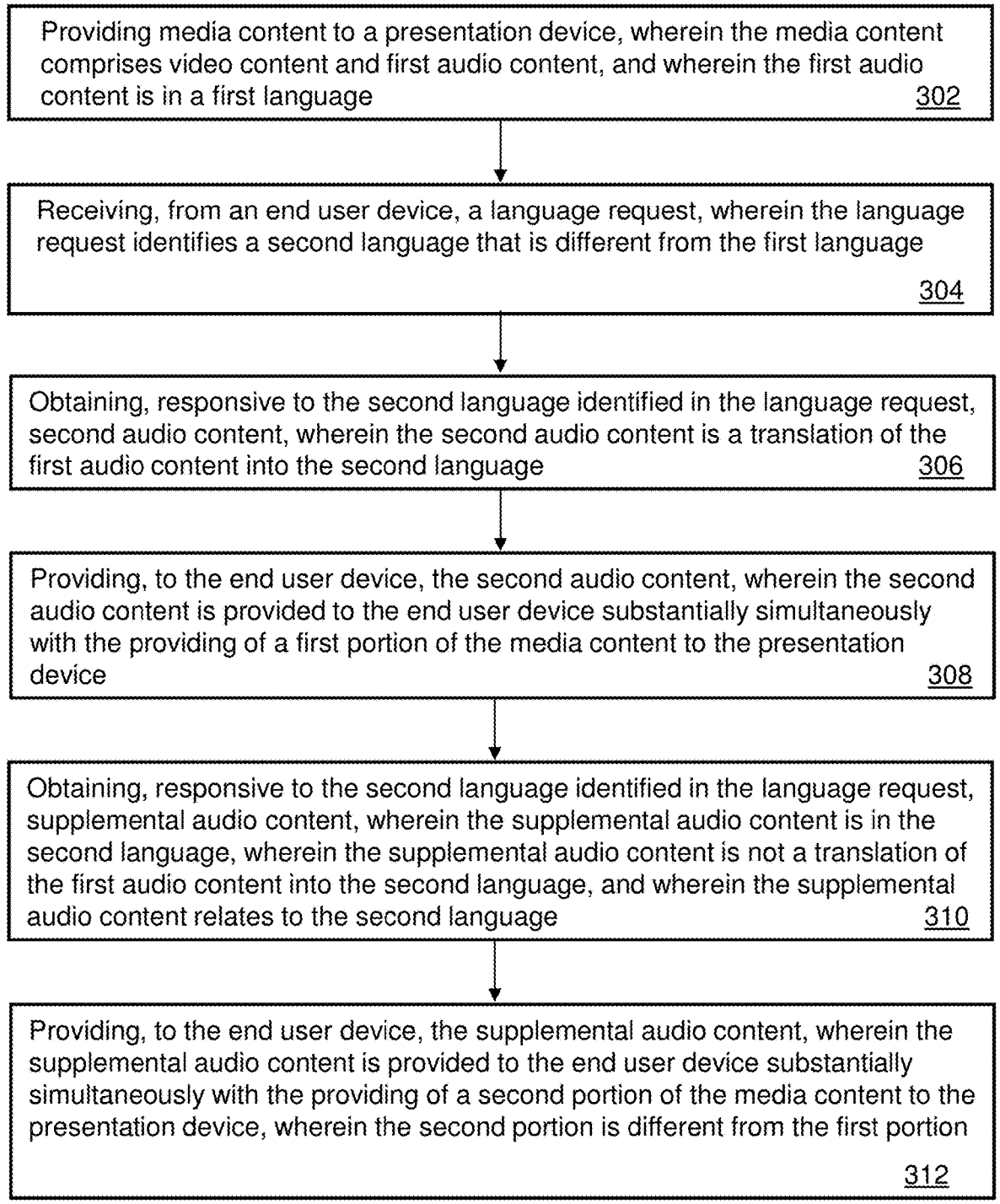
FIG. 3A depicts an illustrative embodiment of a method used in portions of the systems described in FIGS. 1A-1E.

Referring now to FIG. 3A, this depicts an illustrative embodiment of a method used by systems 100, 120, 140, 160 and/or 180 of FIGS. 1A-1E. While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3A, method 300 begins at step 302 with providing media content to a presentation device (e.g., a television that is viewable by a plurality of people, such as in an airport terminal, a train station, a bus station, a restaurant, a sports bar), wherein the media content comprises video content and first audio content, and wherein the first audio content is in a first language. Method 300 then continues to step 304 with receiving, from an end user device (e.g., a smartphone), a language request, wherein the language request identifies a second language that is different from the first language. Method 300 then continues to step 306 with obtaining (e.g., from a database via a network), responsive to the second language identified in the language request, second audio content, wherein the second audio content is a translation of the first audio content into the second language. Method 300 then continues to step 308 with providing, to the end user device, the second audio content, wherein the second audio content is provided to the end user device substantially simultaneously with the providing of a first portion (e.g., a non-advertisement portion) of the media content to the presentation device. Method 300 then continues to step 310 with obtaining (e.g., from a database via a network), responsive to the second language identified in the language request, supplemental audio content, wherein the supplemental audio content is in the second language, wherein the supplemental audio content is not a translation of the first audio content into the second language, and wherein the supplemental audio content relates to the second language. Method 300 then continues to step 312 with providing, to the end user device, the supplemental audio content, wherein the supplemental audio content is provided to the end user device substantially simultaneously with the providing of a second portion (e.g., an advertisement portion) of the media content to the presentation device, wherein the second portion is different from the first portion.

In one embodiment, the obtaining the supplemental audio content can comprise selecting the supplemental audio content (e.g., from among a plurality of supplemental audio contents) based on a behavioral profile associated with individuals who use the second language as a means or method of communication (for instance, the behavioral profile for individuals who use Spanish as a means or method of communication can identify certain likes/dislikes/preferences for speakers of Spanish and the behavioral profile for individuals who use French as a means or method of communication can identify certain likes/dislikes/preferences for speakers of French). The behavioral profile can be obtained from a database of a plurality of behavioral profiles (for instance, the behavioral profile can be obtained from database A 164A, database B 164B, database A 184A and/or database B 184B). Each of the plurality of behavioral profiles can be associated with a given language.

Figure 3B:
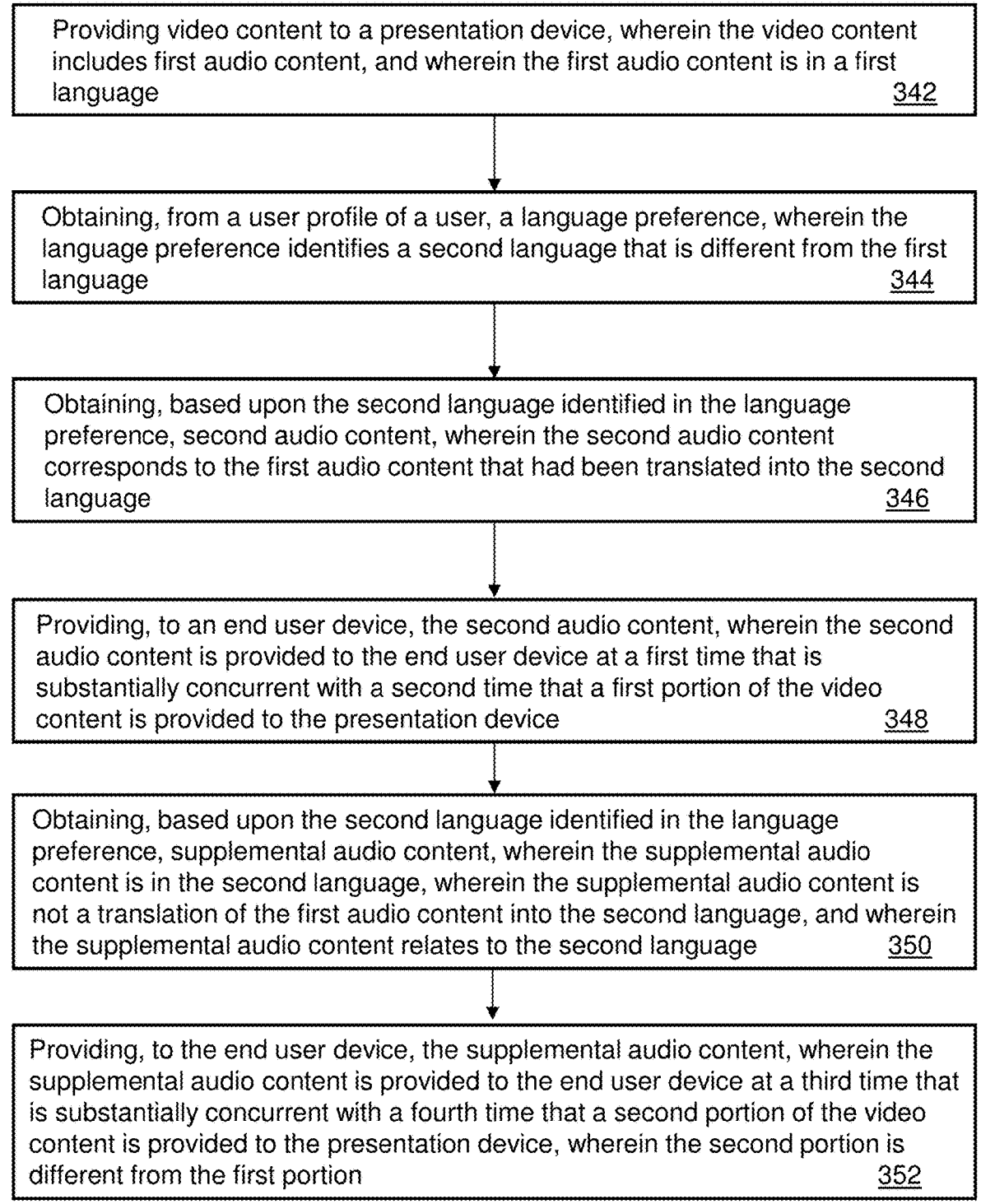
FIG. 3B depicts an illustrative embodiment of a method used in portions of the systems described in FIGS. 1A-1E.

Referring now to FIG. 3B, this depicts an illustrative embodiment of a method used by systems 100, 120, 140, 160 and/or 180 of FIGS. 1A-1E. While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3B, method 340 begins at step 342 with providing video content to a presentation device (e.g., a television that is viewable by a plurality of people, such as in an airport terminal, a train station, a bus station, a restaurant, a sports bar), wherein the video content includes first audio content, and wherein the first audio content is in a first language. Method 340 then continues to step 344 with obtaining, from a user profile of a user, a language preference, wherein the language preference identifies a second language that is different from the first language. In one example, the user profile can be accessed via a network (e.g., from a database). In another example, the user profile can be associated with subscription information of the user. Method 340 then continues to step 346 with obtaining (e.g., from a database via a network), based upon the second language identified in the language preference, second audio content, wherein the second audio content corresponds to the first audio content that had been translated into the second language. Method 340 then continues to step 348 with providing, to an end user device (e.g., a smartphone), the second audio content, wherein the second audio content is provided to the end user device at a first time that is substantially concurrent with a second time that a first portion (e.g., a non-advertisement portion) of the video content is provided to the presentation device. Method 340 then continues to step 350 with obtaining (e.g., from a database via a network), based upon the second language identified in the language preference, supplemental audio content, wherein the supplemental audio content is in the second language, wherein the supplemental audio content is not a translation of the first audio content into the second language, and wherein the supplemental audio content relates to the second language. Method 340 then continues to step 352 with providing, to the end user device, the supplemental audio content, wherein the supplemental audio content is provided to the end user device at a third time that is substantially concurrent with a fourth time that a second portion (e.g., an advertisement portion) of the video content is provided to the presentation device, wherein the second portion is different from the first portion.

In one embodiment, the obtaining the supplemental audio content can comprise selecting the supplemental audio content (e.g., from among a plurality of supplemental audio contents) based on a behavioral profile associated with individuals who use the second language as a means or method of communication (for instance, the behavioral profile for individuals who use German as a means or method of communication can identify certain likes/dislikes/preferences for speakers of German and the behavioral profile for individuals who use Greek as a means or method of communication can identify certain likes/dislikes/preferences for speakers of Greek). The behavioral profile can be obtained from a database of a plurality of behavioral profiles (for instance, the behavioral profile can be obtained from database A 164A, database B 164B, database A 184A and/or database B 184B). Each of the plurality of behavioral profiles can be associated with a given language.

Referring now to FIG. 3C, this depicts an illustrative embodiment of a method used by systems 100, 120, 140, 160 and/or 180 of FIGS. 1A-1E. While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3C, method 370 begins at step 372 with engaging (by an end user device, such as a smartphone) in a communication session with a content providing device (e.g., a dongle and/or a set-top box), wherein the communication session comprises receiving from the content providing device a list of a plurality of available languages corresponding to audio content that the content providing device is providing to a television (e.g., a television that is viewable by a plurality of people, such as in an airport terminal, a train station, a bus station, a restaurant, a sports bar) in association with a media program and wherein the communication session comprises sending (from the end user device) to the content providing device a selected language chosen from the list. Method 370 then continues to step 374 with receiving from the content providing device the audio content in the selected language, wherein the audio content is received (by the end user device) substantially simultaneously with the providing of a first portion (e.g., a non-advertisement portion) of the media program to the television. Method 370 then continues to step 376 with receiving from the content providing device an advertising image, wherein the advertising image is received by the end user device substantially simultaneously with the providing of a second portion (e.g., an advertisement portion) of the media program to the television, wherein the second portion is different from the first portion and wherein the advertising image is not part of the media program. Method 370 then continues to step 378 with presenting, on the display (of the end user device), the advertising image.

In one embodiment, the advertising image can be obtained (e.g., by the content providing device) by being selected (e.g., from among a plurality of advertising images) based on a behavioral profile associated with individuals who use the selected language as a means or method of communication (for instance, the behavioral profile for individuals who use English as a means or method of communication can identify certain likes/dislikes/preferences for speakers of English and the behavioral profile for individuals who use Portuguese as a means or method of communication can identify certain likes/dislikes/preferences for speakers of Portuguese). The behavioral profile can be obtained (e.g., by the content providing device) from a database of a plurality of behavioral profiles (for instance, the behavioral profile can be obtained from database A 164A, database B 164B, database A 184A and/or database B 184B). Each of the plurality of behavioral profiles can be associated with a given language.

As described herein, various embodiments provide a non-interfering multi-language TV dongle.

As described herein, various embodiments provide for distributing audio tracks in one or more languages to one or more viewers of a media program (e.g., a television show, a movie, a sporting event). Various embodiments can be useful wherever multiple people watch a single media program (e.g., airports, bus terminals, train stations, doctor's offices, dentist's offices bars).

In one embodiment, a dongle is provided which receives HDMI video from a set-top box, reads the audio tracks and streams a selected audio track (e.g., via WiFi) to an end user listener (e.g., upon request of the end send user listener). An app can be installed on an end user device (e.g., a smartphone). The app can communicate with a web server in the dongle. In one example, the web server can serve all user HTTP requests (such as for configuration and audio streaming) to one or more end user devices. The app can be used by the end user listener to select a desired audio track language and to start, stop, fast forward, rewind, and/or pause audio streaming to the end user device.

In one embodiment, the dongle is a hardware device that can communicate with legacy (that is, existing) set-top boxes. In another embodiment, rather than an external dongle, the functionality of the dongle may be built into the set top-box and/or the TV (e.g., utilizing software and/or firmware).

In one embodiment, an app (that is, application) running on a smartphone can communicate with a dongle via HTTP (e.g., using request/response) and/or via HTML 5. Audio and/or video communication can be supported by the HTTP and/or HTML 5.

In one embodiment, audio data can be unicast and video data can be multicast. In another example, video data can be broadcast and/or transmitted via peer-to-peer.

In another example, extraction of a language track from media content can be upon command. In another example, language translation can be performed by machine (e.g., in real-time). In another example, language translation (such as by a dongle) can be based upon subtitle information and/or based upon closed caption information.

In another example, an app running on an end user device (e.g., a smartphone) can provide information related to media content.

In another example, an app running on an end user device (e.g., a smartphone) can track usage (e.g., how many people have requested and/or are listening to a particular language for particular media content). Such tracked usage may be stored and/or reported to a server (such as a central server) for aggregation and/or advertising purposes.

In another example, an app running on an end user device can look for a dongle that has a particular language available.

In another example, a dongle can (if a requested language is not available in a particular media content stream or broadcast) look for the content in the requested language on a network (e.g., in one or more databases).

As described herein, various embodiments can be utilized at places where there are people coming from countries speaking different languages. Various embodiments provide a way for audio in different languages to be streamed to people who are watching the same show (but who speak different languages). For instance, in public places such as airport or sports bar (or even home parties where many people may be speaking different languages but watching the same TV show) a mechanism is provided to supply each person with audio content in the language that they understand.

In another embodiment, dongle(s) as described herein can be used in the situation where there are many TVs (e.g., presenting many different shows) in a public room. In this case, one or more of the TV's can be muted and each end user can receive audio for the muted TV show that he or she is watching.

In another embodiment, dongle(s) as described herein can be used in the context of video that has been digitized.

In another example, a dongle as described herein can be low-cost, easy to implement and useful for legacy (that is, existing) applications.

Figure 4:
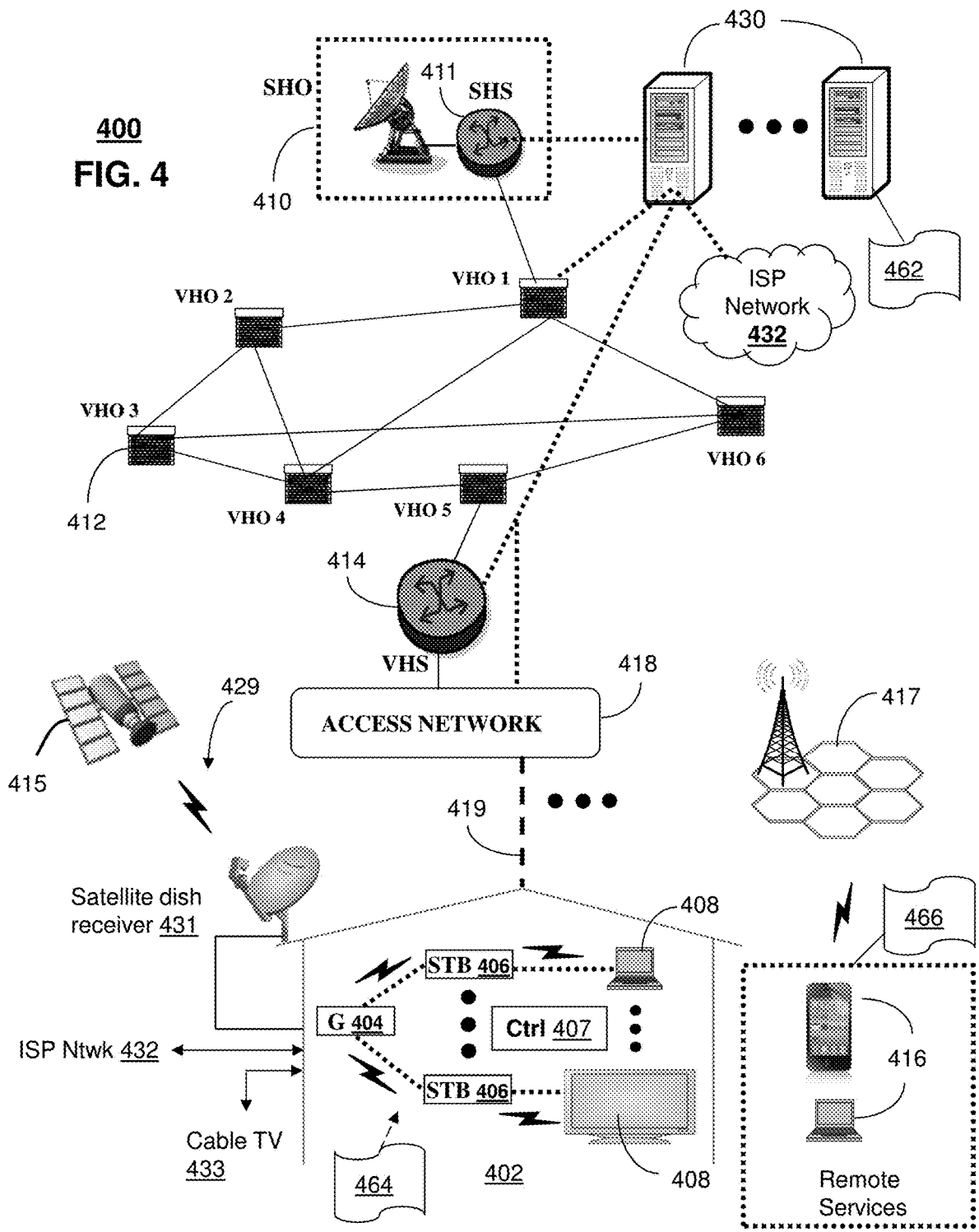
FIG. 4 depicts an illustrative embodiment of a communication system that provides media services that can be used in connection with providing content by use of the systems of FIGS. 1A-1E and the methods of FIGS. 3A-3C.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100, 120, 140, 160 and/or 180 of FIGS. 1A-1E as another representative embodiment of communication system 400. For instance, one or more devices illustrated in the communication system 400 of FIG. 4 can function as an end user device, a set-top box, a dongle, a television, a content source and/or a database.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a control server (herein referred to as control server 430). The control server 430 can use computing and communication technology to perform function 462, which can include among other things, enabling methods 300, 340 and 370 of FIGS. 3A-3C. The media processors 406 and wireless communication devices 416 can be provisioned with software functions 464 and 466, respectively, to utilize the services of control server 430. For instance, functions 464 and 466 of media processors 406 and wireless communication devices 416 can be similar to the functions described for the end user devices, set-top boxes and/or dongles of FIGS. 1A-1E in accordance with methods 300, 340 and/or 370.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
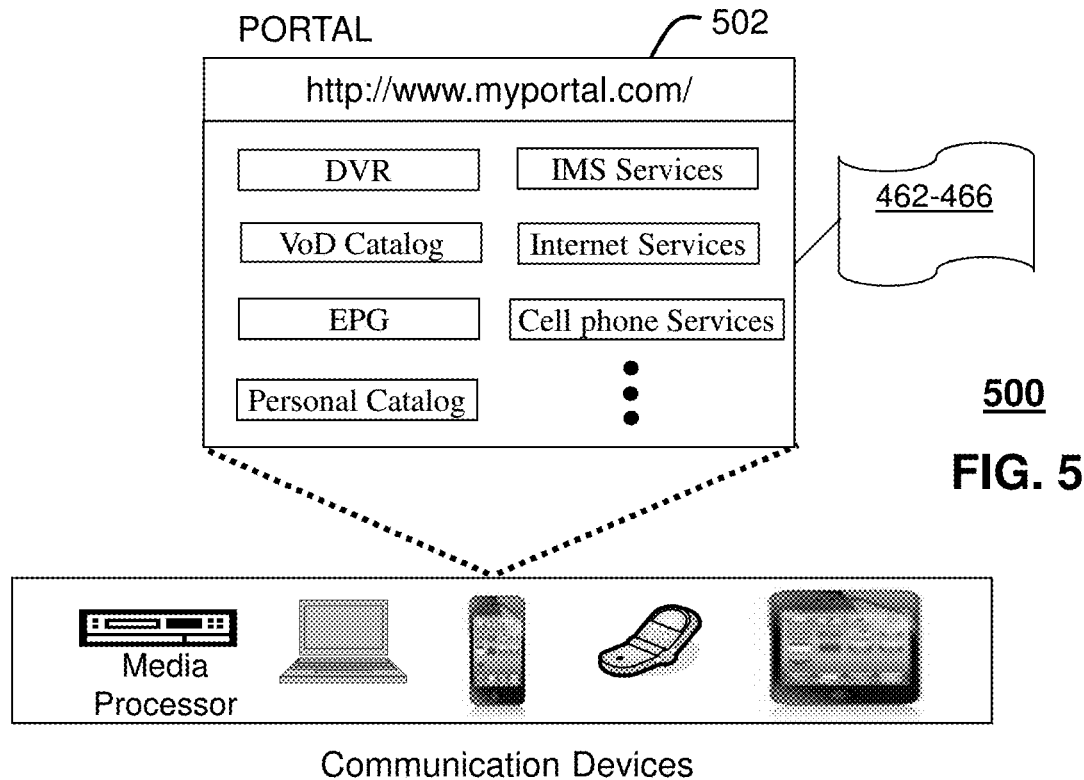
FIG. 5 depicts an illustrative embodiment of a web portal for interacting with the systems of FIGS. 1A-1E and 4 and the methods of FIGS. 3A-3C in order to provide content.

FIG. 5 depicts an illustrative embodiment of a web portal 502 of a communication system 500. Communication system 500 can be overlaid or operably coupled with systems 100, 120, 140, 160 and/or 180 of FIGS. 1A-1E and/or communication system 400 as another representative embodiment of systems 100, 120, 140, 160 and/or 180 of FIGS. 1A-1E and/or communication system 400. The web portal 502 can be used for managing services of systems 100, 120, 140, 160 and/or 180 of FIGS. 1A-1E and/or communication system 400. A web page of the web portal 502 can be accessed by a Uniform Resource Locator (URL) with an Internet browser using an Internet-capable communication device such as those described in FIGS. 1A-1E and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464-466 to adapt these applications as may be desired by subscribers and/or service providers of systems 100, 120, 140, 160 and/or 180 of FIGS. 1A-1E and/or communication system 400. For instance, users of the services provided by dongle 104, 124, 144A, 144B, set-top box 106, 126, 146A, 146B, 146C, server 166, 186 and/or or server 430 can log into their on-line accounts and provision the dongle 104, 124, 144A, 144B, set-top box 106, 126, 146A, 146B, 146C, server 166, 186 and/or or server 430 with user profiles, configuration information, contact information, IP address information (e.g., to enable communication between devices), network address information (e.g., to enable communication between devices), web information (e.g., to enable communication between devices), and so on. Service providers can log onto an administrator account to provision, monitor and/or maintain the systems 100, 120, 140, 160 and/or 180 of FIGS. 1A-1E or server 430.

Figure 6:
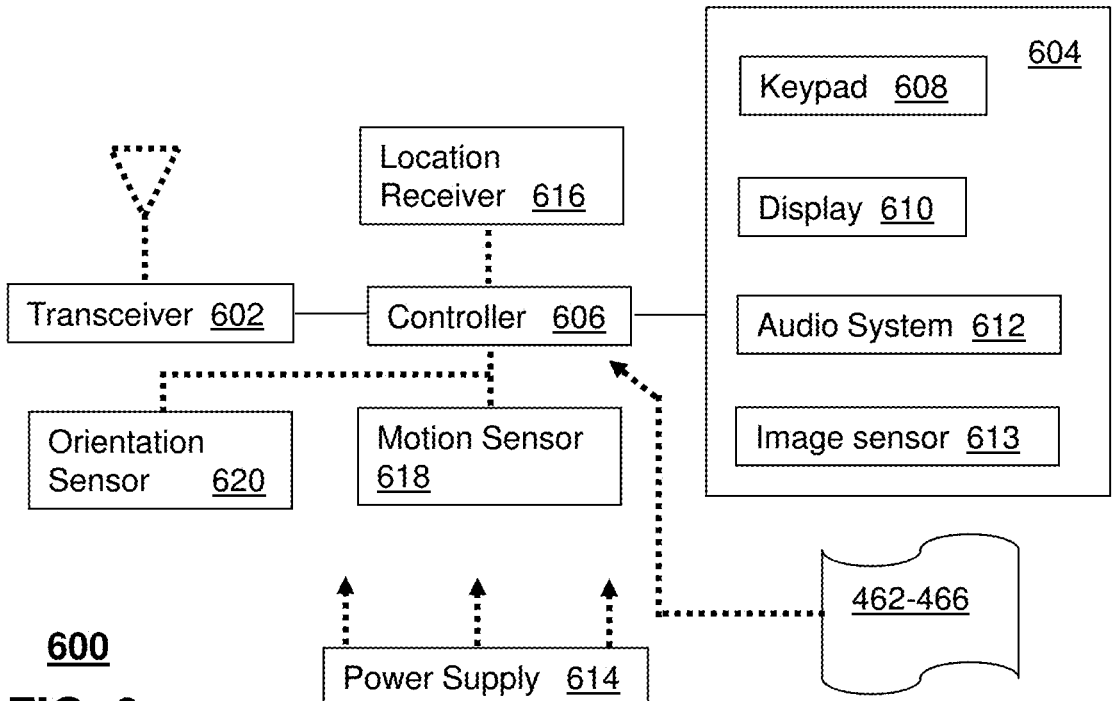
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1A-1E and/or FIG. 4 and can be configured to perform portions of (or all of) methods 300, 340 and/or 370 of FIGS. 3A-3C.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIGS. 1A-1E, the media processor 406, the media devices 408, or the portable communication devices 416 of FIG. 4. It will be appreciated that the communication device 600 can also represent other devices that can operate in systems 100, 120, 140, 160 and/or 180 of FIGS. 1A-1E or communication system 400 of FIG. 4 such as a gaming console and a media player. In addition, the controller 606 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, any desired number of dongles can communicate with any desired number of set-top box(es), television(s) and/or end user mobile device(s). Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
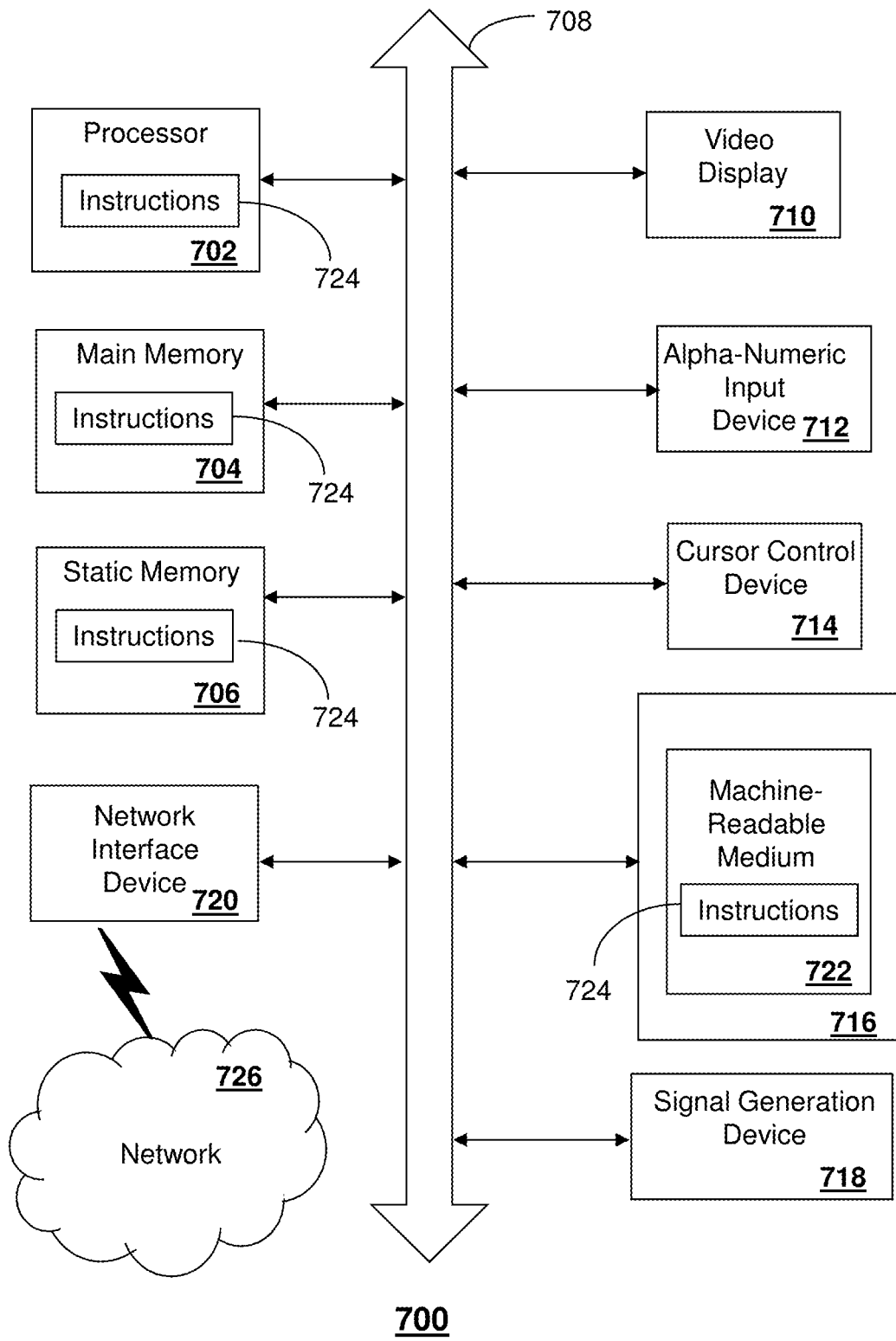
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the control server 430, the media processor 406, a dongle of FIGS. 1A-1E, a set-top box of FIGS. 1A-1E, a television of FIGS. 1A-1E, an end user device of FIGS. 1A-1E, a server of FIGS. 1D-1E, a content source of FIGS. 1D-1E and/or a database of FIGS. 1D-1E. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, by a set-top box media processing system including a processor, over a network connection from a dongle device communicatively coupled to an end user device, a language request associated with media content comprising video content and first audio content, wherein the first audio content is in a first language, wherein the language request identifies a second language that is different from the first language, and wherein the media content is provided by the set-top box media processing system to a presentation device;

obtaining, by the set-top box media processing system, second audio content, wherein the second audio content is a translation of the first audio content into the second language;

providing, by the set-top box media processing system, to the dongle device via the network connection, the second audio content, wherein the second audio content is provided to the end user device by the dongle device during provision of a first portion of the media content to the presentation device by the set-top box media processing system;

selecting, by the set-top box media processing system, supplemental audio content from among a plurality of supplemental audio contents based on a behavioral profile associated with the second language;

obtaining, by the set-top box media processing system, the supplemental audio content, wherein the supplemental audio content is in the second language, wherein the supplemental audio content is not a translation of the first audio content into the second language, and wherein the supplemental audio content does not correspond to the first audio content; and providing, by the set-top box media processing system, to the dongle device via the network connection, the supplemental audio content, wherein the supplemental audio content is provided to the end user device by the dongle device during provision of a second portion of the media content to the presentation device by the set-top box media processing system, and wherein the second portion of the media content is different from the first portion of the media content, and wherein the supplemental audio content is not related to the second portion of the media content.

2. The method of claim 1, wherein:
the obtaining the supplemental audio content further comprises selecting, by the set-top box media processing system, the supplemental audio content based on a behavioral profile associated with individuals who communicate via the second language;
the first portion of the media content comprises a non-advertisement portion of the media content; and
the second portion of the media content comprises an advertisement portion of the media content.

3. The method of claim 2, wherein the supplemental audio content is obtained from a database of a plurality of supplemental audio contents wherein the behavioral profile is obtained from a database of a plurality of behavioral profiles, and wherein each of the plurality of behavioral profiles is associated with a given language.

4. The method of claim 1, wherein the supplemental audio content corresponds to the second language itself, comprising an advertisement for one of a product, a service, or a combination thereof that relates to the second language.

5. The method of claim 1, further comprising obtaining, by the set-top box media processing system, the media content and the first audio content from a content source.

6. The method of claim 5, wherein the second audio content is obtained from the content source.

7. The method of claim 6, wherein the content source comprises a broadcast source in operative communication with a set-top box.

8. The method of claim 5, wherein the second audio content is obtained from a database that is distinct from the content source.

9. The method of claim 1, wherein the second audio content is obtained by performing a machine translation of the first audio content.

10. A non-transitory machine-readable storage medium comprising executable instructions that, when executed by a processing system including a processor, facilitate performance of operations, the operations comprising:
obtaining, from a user profile of a user, a language preference associated with video content including first audio content, wherein the first audio content is in a first language, wherein the language preference identifies a second language that is different from the first language;
obtaining, based upon the second language identified in the language preference, second audio content, wherein the second audio content corresponds to the first audio content that had been translated into the second language;
providing, via a network connection to a dongle device communicatively coupled to an end user device, the second audio content, wherein the second audio content is provided to the end user device by the dongle device at a first time that overlaps with a second time that a first portion of the video content is provided to a presentation device;
selecting supplemental audio content from among a plurality of supplemental audio contents based on a behavioral profile associated with the second language;
obtaining, based upon the second language identified in the language preference, the supplemental audio content, wherein the supplemental audio content is in the second language, wherein the supplemental audio content is not a translation of the first audio content into the second language, and wherein the supplemental audio content does not correspond to the first audio content; and
providing, to the dongle device via the network connection, the supplemental audio content, wherein the supplemental audio content is provided to the end user device by the dongle device at a third time that overlaps with a fourth time that a second portion of the video content is provided to the presentation device, wherein the second portion of the video content is different from the first portion of the video content, and wherein the supplemental audio content is not related to the second portion of the video content.

11. The non-transitory machine-readable storage medium of claim 10, wherein the processing system is in operative communication with a set-top box and the processing system is distinct from the set-top box.

12. The non-transitory machine-readable storage medium of claim 10, wherein the processing system is integrated into a set-top box.

13. The non-transitory machine-readable storage medium of claim 10, wherein the presentation device comprises a television.

14. The non-transitory machine-readable storage medium of claim 10, wherein the operations further comprise translating the first audio content into the second audio content.

15. A mobile device comprising:
a display;
a processing system including a processor; and
a memory that stores executable instructions that, when executed by the processing system, facilitate performance of operations, the operations comprising:
engaging in a communication session with a dongle device, wherein the communication session comprises receiving from the dongle device a list of a plurality of available languages corresponding to audio content that a content providing device is providing to a television in association with a media program and wherein the communication session comprises sending to the dongle device a selected language chosen from the list;
receiving, from the dongle device, the audio content in the selected language, wherein the audio content is received by the dongle device from a network content source via a network connection during the providing of a first portion of the media program to the television via a content providing device;
receiving, from the content providing device via the dongle device, an advertising image and advertising audio content, wherein the advertising image and advertising audio content is received by the mobile device during the providing of a second portion of the media program to the television by the content providing device, wherein the second portion of the media program comprising advertising is different from the first portion of the media program wherein the advertising image and the advertising audio content are not part of the media program, and wherein the advertising image and the advertising audio content are unrelated to the advertising of the second portion of the media program and do not correspond to the audio content, the advertising audio content being selected from among a plurality of supplemental audio contents based on a behavioral profile associated with the selected language; and presenting, on the display, the advertising image.

16. The mobile device of claim 15, wherein the advertising image comprises one of a plurality of images, a video, or a combination thereof.

17. The mobile device of claim 15, wherein the first portion of the media program comprises a non-advertisement portion of the media program and the second portion of the media program comprises an advertisement portion of the media program, and wherein the advertising image is obtained from a database of a plurality of advertising images.

18. The mobile device of claim 15, wherein the advertising image comprises an advertisement for a product, an advertisement for a service, or a combination thereof.

19. The mobile device of claim 18, wherein the advertising image relates to the selected language.

20. The mobile device of claim 15, wherein the mobile device comprises a smartphone, a tablet, a laptop computer, or any combination thereof.

* * * * *